US010072101B2

(12) United States Patent
Tsunogae et al.

(10) Patent No.: US 10,072,101 B2
(45) Date of Patent: Sep. 11, 2018

(54) CYCLOOLEFIN RUBBER AND METHOD OF PRODUCTION OF SAME AND RUBBER COMPOSITION, CROSS-LINKED RUBBER, AND TIRE

(71) Applicant: ZEON CORPORATION, Tokyo (JP)

(72) Inventors: Yasuo Tsunogae, Tokyo (JP); Shingo Okuno, Tokyo (JP); Naoaki Kuramoto, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 0 days.

(21) Appl. No.: 15/505,985

(22) PCT Filed: Aug. 26, 2015

(86) PCT No.: PCT/JP2015/073970
§ 371 (c)(1),
(2) Date: Feb. 23, 2017

(87) PCT Pub. No.: WO2016/031847
PCT Pub. Date: Mar. 3, 2016

(65) Prior Publication Data
US 2017/0253695 A1 Sep. 7, 2017

(30) Foreign Application Priority Data
Aug. 27, 2014 (JP) ................................. 2014-173086

(51) Int. Cl.
C08C 1/15 (2006.01)
C08F 132/04 (2006.01)
C08F 8/00 (2006.01)
C08G 61/08 (2006.01)
C08K 3/04 (2006.01)
C08K 3/36 (2006.01)
C08F 6/22 (2006.01)
C08K 5/103 (2006.01)

(52) U.S. Cl.
CPC .................. C08C 1/15 (2013.01); C08F 6/22 (2013.01); C08F 8/00 (2013.01); C08F 132/04 (2013.01); C08G 61/08 (2013.01); C08K 3/04 (2013.01); C08K 3/36 (2013.01); C08K 5/103 (2013.01); C08G 2261/3321 (2013.01); C08G 2261/726 (2013.01); C08G 2261/76 (2013.01)

(58) Field of Classification Search
None
See application file for complete search history.

(56) References Cited

U.S. PATENT DOCUMENTS

| 5,089,554 A | 2/1992 | Bomo et al. | |
| 5,717,022 A | 2/1998 | Beckmann et al. | |
| 2011/0146877 A1* | 6/2011 | Tanaka | B60C 1/00 152/547 |
| 2013/0281615 A1* | 10/2013 | Tsunogae | B60C 1/00 524/588 |
| 2015/0315358 A1* | 11/2015 | Yonemoto | B60C 1/00 524/313 |
| 2016/0152765 A1* | 6/2016 | Michaud | C08F 10/14 156/329 |
| 2017/0129990 A1* | 5/2017 | Tsunogae | C08G 61/08 |
| 2018/0030159 A1* | 2/2018 | Nakatani | C08C 19/25 |

FOREIGN PATENT DOCUMENTS

| CN | 1151999 A | 6/1997 |
| JP | S62-062838 A | 3/1987 |
| JP | H06-248116 A | 9/1994 |
| JP | 09-118786 | * 5/1997 |
| WO | WO 2012/043802 | * 4/2012 |
| WO | WO 2014/098155 | * 6/2014 |

OTHER PUBLICATIONS

Machine translation of JP 09-118786 into English.*
Machine translation of JP 2013-185141 (Sep. 2013).*
Feb. 28, 2017 International Preliminary Report on Patentability issued with International Patent Application No. PCT/JP2015/073970.
Apr. 20, 2018 extended European Search Report issued in European Appication No. 15836399.4.

* cited by examiner

Primary Examiner — Marc S Zimmer
(74) Attorney, Agent, or Firm — Oliff PLC

(57) ABSTRACT

A cycloolefin rubber having a weight average molecular weight of 100,000 to 800,000, having a silyl group at the polymer chain end, and containing a fatty acid ester of a polyvalent alcohol. A cycloolefin rubber excellent in processability at the time of blending and kneading and excellent in low heat buildup property can be provided.

6 Claims, No Drawings

# CYCLOOLEFIN RUBBER AND METHOD OF PRODUCTION OF SAME AND RUBBER COMPOSITION, CROSS-LINKED RUBBER, AND TIRE

TECHNICAL FIELD

The present invention relates to a cycloolefin rubber, more particularly relates to a rubber suitable as a tire material which is excellent in processability at the time of compounding and kneading due to its little toluene insoluble, and excellent in tire properties such as low fuel consumption. Further, the present invention relates to a method of production of such a cycloolefin rubber and to a rubber composition, cross-linked rubber, and tire using such a cycloolefin rubber.

BACKGROUND ART

In recent years, resource conservation, environmental measures, etc. have been emphasized. Along with this, there have been increasingly stronger calls for lower fuel consumption of vehicles. For the automobile tires, it is demanded to contribute for lower fuel consumption, by making the rolling resistance smaller. To make the rolling resistance of tires smaller, in general a rubber material which can give vulcanized rubber with a low heat buildup is used as the rubber material for the tires.

As the rubber for tire, in general, a conjugated diene rubber such as natural rubber, isoprene rubber, butadiene rubber, and styrene-butadiene rubber has been used. In recent years, it is been proposed to lower the heat buildup property by using a conjugated diene rubber in which a substituent with affinity with the silica used as a filler is introduced to the polymer chain end.

On the other hand, in a cycloolefin rubber obtained by ring-opening metathesis polymerization of a cycloolefin such as cyclopentene, by adding an olefin compound having a substituent with affinity with silica at the time of polymerization it is possible to easily introduce the substituent to its end. For example, Patent Documents 1 to 3 propose a method of introducing an alkoxysilyl group to a polymer chain end of cyclopentene rubber. It is known that by introducing an alkoxysilyl group, rubber for tire excellent in low fuel consumption and abrasion resistance is obtained. However, according to studies of the present inventors, there are problems that depending on manufacturing conditions or storage conditions, cycloolefin rubber alkoxylated at the polymer chain end ends up forming ingredients not dissolving in general organic solvents after recovery by the usual recovery method of steam stripping or after long term storage and cannot be blended or kneaded due to this and that even after forming and vulcanization, the tire properties deteriorate and the demand for low fuel consumption cannot be met.

RELATED ART

Patent Documents

Patent Document 1: Japanese Patent Publication No. 2010-37362A
Patent Document 2: International Publication No. WO2011/87072A
Patent Document 3: International Publication No. WO2012/43802A

SUMMARY OF THE INVENTION

Problem to be Solved by the Invention

An object of the present invention is the provision of silyl-modified cycloolefin rubber sufficiently dissolving in a general organic solvent and excellent in processability at the time of blending and kneading without regard to the recovery step or storage condition and excellent in low fuel consumption.

Means for Solving the Problem

The present inventors engaged in in-depth research to overcome the problems in the prior art and as a result discovered that a silyl-modified cycloolefin rubber produced by steam stripping and a silyl-modified cycloolefin rubber stored under a condition of high temperature and a high humidity contain considerable amounts of insolubles which cannot be dissolved in toluene and therefore deteriorate in processability and cannot improve low fuel consumption due to insufficient kneading. Based on this discovery, the present inventors discovered that, as a method of obtaining a silyl-modified cycloolefin rubber in which insolubles are not formed, a method comprising adding a fatty acid ester of a polyvalent alcohol can give a cross-linked rubber excellent in low fuel consumption without deterioration of processability and thereby completed the present invention. That is, according to the present invention, the following [1] to [11] have been provided.

[1] A cycloolefin rubber having a weight average molecular weight of 100,000 to 800,000, having a silyl group at the polymer chain end, and containing a fatty acid ester of a polyvalent alcohol.

[2] The cycloolefin rubber according to [1] wherein a content of the fatty acid ester of a polyvalent alcohol in the cycloolefin rubber is 0.0002 to 15 wt %.

[3] The cycloolefin rubber according to [1] or [2] wherein a content of the fatty acid ester of a polyvalent alcohol is 0.001 to 100 moles with respect to 1 mole of the silyl group.

[4] The cycloolefin rubber according to any one of [1] to [3] wherein the fatty acid ester of a polyvalent alcohol is a sorbitan fatty acid ester.

[5] A method of production of a cycloolefin rubber according to any one of [1] to [4], comprising a first step of performing ring-opening polymerization of a monocycloolefin and end modification by a compound having a silyl group to obtain a polymer solution containing a cycloolefin polymer having a silyl group at a polymer chain end and a second step of causing the cycloolefin polymer contained in the polymer solution to coagulate in the presence of the fatty acid ester of a polyvalent alcohol.

[6] The method of production of a cycloolefin rubber according to [5], wherein the second step includes adding the fatty acid ester of a polyvalent alcohol to the polymer solution, then performing steam stripping.

[7] The method of production of a cycloolefin rubber according to [5], wherein the second step includes performing a poor solvent coagulation of the polymer solution, the poor solvent coagulation causing the cycloolefin polymer to coagulate by using a poor solvent for the cycloolefin polymer having a silyl group at a polymer chain end, and in the poor solvent coagulation, the fatty acid ester of a polyvalent alcohol is used in a state where the fatty acid ester of a polyvalent alcohol is contained in the polymer solution and/or the poor solvent.

[8] A rubber composition comprising 100 parts by weight of a rubber ingredient including a cycloolefin rubber according to any one of [1] to [4] and a total of 20 to 200 parts by weight of silica and/or carbon black.

[9] The rubber composition according to [8] further comprising a cross-linking agent.

[10] Cross-linked rubber obtained by cross-linking the rubber composition according to [9].

[11] A tire obtained by using a cross-linked rubber according to [10].

Effects of Invention

According to the present invention, it is possible to provide a cycloolefin rubber excellent in processability at the time of blending and kneading and excellent in low fuel consumption.

DESCRIPTION OF EMBODIMENTS

The cycloolefin rubber of the present invention is a cycloolefin rubber having a weight average molecular weight of 100,000 to 800,000, having a silyl group at a polymer chain end, and containing a fatty acid ester of a polyvalent alcohol. The cycloolefin rubber of the present invention has toluene insolubles of less than 20 wt % even after storage for one day under a condition of a temperature of 85° C. and a humidity of 85%, and is excellent in processability at the time of blending and kneading even after storage under such a condition, and can give a cross-linked rubber excellent in low fuel consumption.

A "cycloolefin rubber" is a ring-opening metathesis polymer of a monocycloolefin. A "monocycloolefin" is a single ring cycloolefin. Specifically, cyclobutene, cyclopentene, methylcyclopentene, cyclooctene, 1,5-cyclooctadiene, 1,5,9-cyclododecatriene, etc. may be mentioned. Among these as well, from the ease of polymerization, cyclopentene is preferable.

The cycloolefin rubber of the present invention has less than 20 wt % of insolubles at the time of dissolution in a large excess of toluene (that is, toluene insolubles) and has an amount of toluene insolubles of less than 20 wt % even after storage under a condition of a temperature of 85° C. and humidity of 85%. If the amount of toluene insolubles is large, not only the processability deteriorates, but also the affinity with silica becomes low and the effect of improvement of the low fuel consumption becomes small. The amount of toluene insolubles after storage under a condition of a temperature of 85° C. and humidity of 85% is preferably 15 wt % or less, more preferably 10 wt % or less, particularly preferably 5 wt % or less (Cycloolefin Rubber)

The cycloolefin rubber of the present invention has a silyl group at a polymer chain end. For example, one having a group represented by the general formula (1) may be preferably mentioned.

$$—Si(OR^1)_a(R^2)_{3-a} \quad (1)$$

In the general formula (1), each of $R^1$ and $R^2$ is a hydrogen atom or hydrocarbon group having 1 to 20 carbon atoms which may contain a hetero atom. "a" is an integer of 1 to 3.

Among the silyl group as well, for example, from the viewpoint of a high affinity with the silica or carbon black as a filler used when making a rubber material for tire use and a high effect of improvement of low heat buildup property, an alkoxysilyl group, aryloxysilyl group, acyloxysilyl group, alkylsiloxysilyl group, arylsiloxysilyl group, and hydroxysilyl group are preferable.

An alkoxysilyl group is a group having a silicon atom which is bonded with one or more alkoxy groups. As specific examples, a trimethoxysilyl group, (dimethoxy) (methyl) silyl group, (methoxy) (dimethyl)silyl group, (methoxy) (dichloro)silyl group, triethoxysilyl group, (diethoxy) (methyl)silyl group, (ethoxy) (dimethyl)silyl group, (dimethoxy) (ethoxy)silyl group, (methoxy) (diethoxy)silyl group, tripropoxysilyl group, tributoxysilyl group, etc. may be mentioned.

An aryloxysilyl group is a group having a silicon atom which is bonded with one or more aryloxy groups. As specific examples, a triphenoxysilyl group, (diphenoxy) (methyl)silyl group, (phenoxy) (dimethyl)silyl group, (phenoxy) (dichloro)silyl group, (diphenoxy) (ethoxy)silyl group, (phenoxy) (diethoxy)silyl group, etc. may be mentioned. Note that, among these, a (diphenoxy) (ethoxy)silyl group and (phenoxy) (diethoxy)silyl group have an alkoxy group in addition to an aryloxy group, so are also classified as an alkoxysilyl group.

An acyloxysilyl group is a group having a silicon atom which is bonded with one or more acyloxy groups. As specific examples, a triacyloxysilyl group, (diacyloxy) (methyl)silyl group, (acyloxy) (dimethyl)silyl group, (acyloxy) (dichloro)silyl group, etc. may be mentioned.

An alkylsiloxysilyl group is a group having a silicon atom which is bonded with one or more alkylsiloxy groups. As specific examples, a tris(trimethylsiloxy)silyl group, trimethylsiloxy(dimethyl)silyl group, triethylsiloxy(diethyl)silyl group, tris(dimethylsiloxy)silyl group, etc. may be mentioned.

An arylsiloxysilyl group is a group having a silicon atom which is bonded with one or more arylsiloxy groups. As specific examples, a tris(triphenylsiloxy)silyl group, triphenylsiloxy(dimethyl)silyl group, tris(diphenylsiloxy)silyl group, etc. may be mentioned.

A hydroxysilyl group is a group having a silicon atom which is bonded with one or more hydroxy groups. As specific examples, a trihydroxysilyl group, (dihydroxy) (methyl)silyl group, (hydroxy) (dimethyl)silyl group, (hydroxy) (dichloro)silyl group, (dihydroxy) (ethoxy)silyl group, (hydroxy) (diethoxy)silyl group, etc. may be mentioned. Note that, among these, a (dihydroxy) (ethoxy)silyl group and (hydroxy) (diethoxy)silyl group have an alkoxy group in addition to a hydroxy group, so are also classified as an alkoxysilyl group.

Further, as a silyl group, in addition to the above, a linear polysiloxane group shown by the following general formula (2) and a cyclic polysiloxane group shown by the following general formula (3) are also suitable.

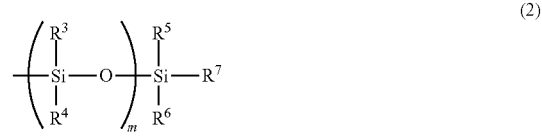

(2)

In the general formula (2), each of $R^3$ to $R^7$ is a group selected from a hydrogen atom, and an alkyl group, aryl group, alkoxy group, aryloxy group, acyloxy group, alkylsiloxy group, and arylsiloxy group which have 1 to 10 carbon atoms. Further, "m" is an integer of 1 to 10.

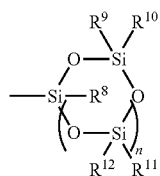

(3)

In the general formula (3), each of $R^8$ to $R^{12}$ is a group selected from a hydrogen atom, and an alkyl groups, aryl group, alkoxy group, aryloxy group, acyloxy group, alkylsiloxy group, and arylsiloxy group which have 1 to 10 carbon atoms. Further, "n" is an integer of 1 to 10.

Note that, in the general formulas (2) and (3), from the viewpoint of a higher polymerization activity when obtaining a cycloolefin rubber, each of $R^3$ to $R^7$ and $R^8$ to $R^{12}$ is preferably a hydrogen atom or alkyl group having 1 to 6 carbon atoms such as methyl group, ethyl group, propyl group, and cyclohexyl group.

The ratio of introduction of a silyl group at a polymer chain end of the cycloolefin rubber of the present invention is not particularly limited, but the value of the percentage of number of polymer chain end of cycloolefin rubber into which a silyl group is introduced/number of a polymer chain of cycloolefin rubber is preferably 10% or more, more preferably 20% or more, still more preferably 30% or more, particularly preferably 40% or more. The higher the ratio of introduction of a silyl group, the higher the affinity with silica or carbon black as a filler used when making a rubber material for tire use and due to this the higher the effect of improvement of the low heat buildup property, so the more preferable. Note that, the method of measurement of the ratio of introduction of a silyl group at a polymer chain end is not particularly limited, but for example may be found from the peak surface area ratio corresponding to the silyl group found by $^1$H-NMR spectral measurement and the number average molecular weight found from gel permeation chromatography.

Further, the cycloolefin rubber of the present invention may contain a structural unit derived from a polycyclic cycloolefin having a metathesis reactivity other than structural units derived from monocycloolefin. However, from the viewpoint of lowering the glass transition temperature of the cycloolefin rubber and due to this maintaining good rubber properties under a low temperature, the ratio of content of the structural units derived from a monocycloolefin is preferably made 50 mol % or more, more preferably 60 mol % or more, still more preferably 65% or more. If the ratio of content of the structural units derived from a monocycloolefin is too low, the glass transition temperature of the cycloolefin rubber becomes higher, the low temperature rubber properties end up falling, and the features as a cycloolefin rubber (for example, the characteristics as a linear polymer not having short a chain branch) end up being lost, so this is not preferable.

The molecular weight of the cycloolefin rubber of the present invention is a value of the weight average molecular weight of 100,000 to 800,000, preferably 150,000 to 750,000, more preferably 200,000 to 700,000. By the cycloolefin rubber having such a molecular weight, a cross-linked rubber having excellent mechanical properties can be given.

Further, the ratio (Mw/Mn) of the number average molecular weight (Mn) and weight average molecular weight (Mw) which are converted to polystyrene measured by gel permeation chromatography in the cycloolefin rubber of the present invention is not particularly limited, but is normally 5.0 or less, preferably 4.5 or less, more preferably 4.0 or less. By having such Mw/Mn, it becomes possible to give a cross-linked rubber having more excellent mechanical properties.

Note that, in the present invention, the molecular weight of the cycloolefin rubber is measured as a value converted to polystyrene by gel permeation chromatography.

In a double bond present in the repeating units forming the cycloolefin rubber of the present invention, the cis/trans ratio is not particularly limited, but is usually set to 10/90 to 90/10 in range, but from the viewpoint of obtaining a cycloolefin rubber able to give cross-linked rubber exhibiting excellent properties under a low temperature, 30/70 to 90/10 in range is preferable.

Further, the cycloolefin rubber of the present invention contains a fatty acid ester of a polyvalent alcohol in addition to the above-mentioned a rubber ingredient forming the main ingredient. A "polyvalent alcohol" is a compound having at least two hydroxyl groups. A saccharide, glycol and polyhydroxy compound may be mentioned. Among these as well, a saccharide with 5 or 6 carbon atoms and having three or more hydroxyl groups is preferable. Further, the fatty acid forming an ester with a polyvalent alcohol is preferably a higher fatty acid having 10 to 20 carbon atoms. The higher fatty acid having 10 to 20 carbon atoms may be a saturated fatty acid or may be an unsaturated fatty acid. For example, stearic acid, lauric acid, oleic acid, palmitic acid, etc. may be mentioned. Furthermore, among the fatty acid esters of a polyvalent alcohol, a compound where a part of the plurality of hydroxyl groups of the polyvalent alcohol forms an ester with the fatty acid and the remainder remains as a hydroxyl group is more preferable. Among such fatty acid esters of a polyvalent alcohol as well, a fatty acid ester of a saccharide is preferable, while a sorbitan fatty acid ester is particularly preferable. Specifically, sorbitan monolaurate, sorbitan monopalmitate, sorbitan monostearate, sorbitan distearate, sorbitan monooleate, sorbitan tristearate, sorbitan trioleate, sorbitan dioleate, etc. may be mentioned. As a sorbitan fatty acid ester, one further containing a polyoxyethylene group is also preferably used. As specific examples of such a sorbitan fatty acid ester, polyoxyethylenesorbitan monolaurate, polyoxyethylenesorbitan monopalmitate, polyoxyethylenesorbitan monostearate, polyoxyethylenesorbitan monooleate, polyoxyethylenesorbitan tristearate, polyoxyethylenesorbitan trioleate, etc. may be mentioned.

In addition, as specific examples of the fatty acid ester of a glycol, polyethyleneglycol monolaurate, polyethyleneglycol monostearate, polyethyleneglycol monooleate, etc. may be mentioned. As specific examples of the fatty acid ester of a polyhydroxy compound, glycerol monostearate, glycerol monooleate, polyoxyethylenesorbitol tetraoleate, etc. may be mentioned.

The content of the fatty acid ester of a polyvalent alcohol is preferably 0.001 to 100 moles with respect to 1 mole of a silyl group of the cycloolefin rubber of the present invention, more preferably 0.002 to 50 moles, still more preferably 0.01 to 20 moles. Further, in the cycloolefin rubber, the content of the fatty acid ester of a polyvalent alcohol is preferably 0.0002 to 15 wt %, more preferably 0.002 to 10 wt %, still more preferably 0.01 to 5 wt %. If the content of the fatty acid ester of a polyvalent alcohol in the cycloolefin rubber is too small, the processability at the time of blending and kneading, in particular, the processability at the time of blending and kneading after storing the rubber, ends up becoming inferior. On the other hand, if the content of the fatty acid ester of a polyvalent alcohol is too large, shear force is not applied at the time of blending and kneading, the dispersion of the silica or carbon black ends up deteriorating.

(Method of Production of Cycloolefin Rubber)

The method of production of the cycloolefin rubber of the present invention is not particularly limited, but the method of production explained below is suitably used.

That is, the cycloolefin rubber is suitably produced by a method of production comprising a first step of performing ring-opening polymerization of a monocycloolefin and end modification by a compound having a silyl group to obtain a polymer solution containing a cycloolefin polymer having a silyl group at a polymer chain end, and a second step of causing the cycloolefin polymer contained in the polymer solution to coagulate in the presence of the fatty acid ester of a polyvalent alcohol.

The cycloolefin rubber of the present invention has a silyl group at a polymer chain end. Accordingly, in the first step, when polymerizing the monocycloolefin by ring-opening polymerization, the method of polymerizing the monocycloolefin using a ring-opening polymerization catalyst in the presence of a compound having a silyl group (preferably, olefin compound having a silyl group) is suitable. By this, it is possible to simultaneously perform ring-opening polymerization of a monocycloolefin and end modification by a compound having a silyl group.

In the method of ring-opening polymerization of the monocycloolefin, the olefin compound having a silyl group able to be used is not particularly limited so long as a compound containing at least one ethylenically unsaturated bond and at least one silyl group each in its molecule. As such an olefin compound having a silyl group, for example, compounds represented by the following general formulas (4) to (7) may be mentioned.

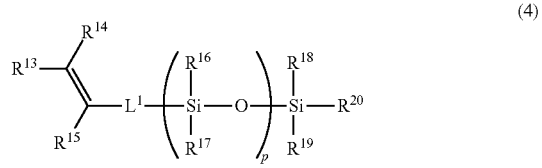
(4)

In the general formula (4), each of $R^{13}$ to $R^{15}$ is a hydrogen atom or hydrocarbon group having 1 to 10 carbon atoms, while each of $R^{16}$ to $R^{20}$ is a group selected from a hydrogen atom, and an alkyl group, aryl group, alkoxy group, aryloxy group, acyloxy group, alkylsiloxy group, and arylsiloxy group which have 1 to 10 carbon atoms. Further, $L^1$ is a single bond or a group connecting a silyl group and a carbon atom forming an olefinic carbon-carbon double bond, while "p" is an integer of 0 to 10.

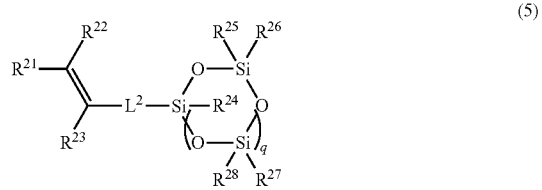
(5)

In the general formula (5), each of $R^{21}$ to $R^{23}$ is a hydrogen atom or hydrocarbon group having 1 to 10 carbon atoms, while each of $R^{24}$ to $R^{28}$ is a group selected from a hydrogen atom, and an alkyl group, aryl group, alkoxy group, aryloxy group, acyloxy group, alkylsiloxy group, and arylsiloxy group which have 1 to 10 carbon atoms. Further, $L^2$ is a single bond or a group connecting an oxysilyl group and a carbon atom forming an olefinic carbon-carbon double bond, while "q" is an integer of 1 to 10.

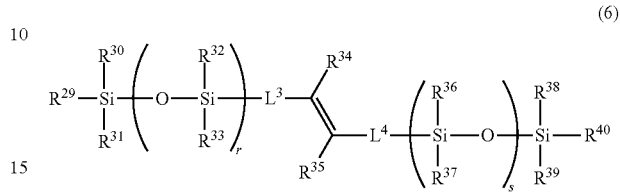
(6)

In the general formula (6), each of $R^{34}$ and $R^{35}$ is a hydrogen atom or hydrocarbon group having 1 to 10 carbon atoms, while each of $R^{29}$ to $R^{33}$ and $R^{36}$ to $R^{40}$ is a group selected from a hydrogen atom, and an alkyl group, aryl group, alkoxy group, aryloxy group, acyloxy group, alkylsiloxy group, and arylsiloxy group which have 1 to 10 carbon atoms. Further, each of $L^3$ and $L^4$ is a single bond or a group connecting a silyl group and a carbon atom forming an olefinic carbon-carbon double bond, while each of "r" and "s" is an integer of 0 to 10.

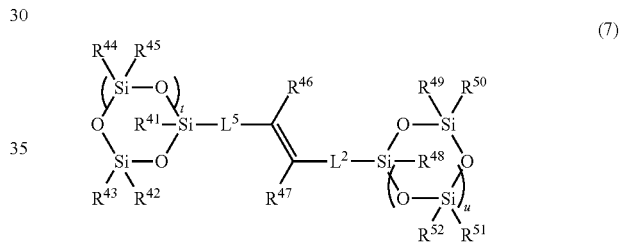
(7)

In the general formula (7), each of $R^{46}$ and $R^{47}$ is a hydrogen atom or hydrocarbon group having 1 to 10 carbon atoms, while each of $R^{41}$ to $R^{45}$ and $R^{48}$ to $R^{52}$ is a group selected from a hydrogen atom, and an alkyl group, aryl group, alkoxy group, aryloxy group, acyloxy group, alkylsiloxy group, and arylsiloxy group which have 1 to 10 carbon atoms. Further, each of $L^5$ and $L^6$ is a single bond or a group connecting an oxysilyl group and a carbon atom forming an olefinic carbon-carbon double bond, while each of "t" and "u" is an integer of 1 to 10.

In the general formulas (4) to (7), each of $R^{13}$ to $R^{15}$, $R^{21}$ to $R^{23}$, $R^{34}$, $R^{35}$, $R^{46}$, and $R^{47}$ is preferably a hydrogen atom. By making these hydrogen atoms, it is possible to make the olefin compound having a silyl group excellent by metathesis reactivity.

Further, in general formulas (4) to (7), each of $L^1$ to $L^6$ is not particularly limited so long as a group able to connect a silyl group and a carbon atom forming an olefinic carbon-carbon double bond, but from the viewpoint of being able to make the olefin compound having a silyl group better by metathesis reactivity, a hydrocarbon group, ether group, or tertiary amino group are preferable, while an aliphatic hydrocarbon group having 1 to 20 carbon atoms and aromatic hydrocarbon group having 6 to 20 carbon atoms are more preferable. Further, a silyl group and a carbon atom forming an olefinic carbon-carbon double bond may be directly bonded without the interposition of these groups.

Note that, when using compounds represented by the general formulas (4) and (5) among the compounds represented by the general formulas (4) to (7), these can be reacted by metathesis reaction to introduce a silyl group to one end of the cycloolefin rubber. Further, when using compounds represented by the general formulas (6) and (7), these can be reacted by metathesis reaction to introduce silyl groups to the both ends of the cycloolefin rubber.

As preferable specific examples of compounds represented by the general formulas (4) and (5), an alkoxysilane compound such as vinyl(trimethoxy)silane, vinyl(triethoxy)silane, allyl(trimethoxy)silane, allyl(methoxy)(dimethyl)silane, allyl(triethoxy)silane, allyl(ethoxy)(dimethyl)silane, styryl(trimethoxy)silane, styryl(triethoxy)silane, styrylethyl(triethoxy)silane, allyl(triethoxysilylmethyl)ether, and allyl(triethoxysilylmethyl)(ethyl)amine; an aryloxysilane compound such as vinyl(triphenoxy)silane, allyl(triphenoxy)silane, and allyl(phenoxy(dimethyl)silane; an acyloxysilane compound such as vinyl(triacetoxy)silane, allyl(triacetoxy)silane, allyl(diacetoxy)methylsilane, and allyl(acetoxy)(dimethyl)silane; an alkylsiloxysilane compound such as allyltris(trimethylsiloxy)silane; an arylsiloxysilane compound such as allyltris(triphenylsiloxy)silane; a polysiloxane compound such as 1-allylheptamethyltrisiloxane, 1-allylnonamethyltetrasiloxane, 1-allylnonamethylcyclopentasiloxane, and 1-allylundecamethylcyclohexasiloxane; etc. may be mentioned.

As preferable specific examples of compounds represented by the general formulas (6) and (7), an alkoxysilane compound such as bis(trimethoxysilyl)ethylene, bis(triethoxysilyl)ethylene, 2-butene-1,4-di(trimethoxysilane), 2-butene-1,4-di(triethoxysilane), and 1,4-di(trimethoxysilylmethoxy)-2-butene; an aryloxysilane compound such as 2-butene-1,4-di(triphenoxysilane); an acyloxysilane compound such as 2-butene-1,4-di(triacetoxysilane); an alkylsiloxysilane compound such as 2-butene-1,4-di[tris(trimethylsiloxy)silane]; an arylsiloxysilane compound such as 2-butene-1,4-di[tris(triphenylsiloxy)silane]; a polysiloxane compound such as 2-butene-1,4-di(heptamethyltrisiloxane) and 2-butene-1,4-di(undecamethylcyclohexasiloxane); etc. may be mentioned.

The amount of use of the olefin compound having a silyl group may be suitably selected in accordance with the molecular weight of the cycloolefin rubber which is produced, but by molar ratio with respect to the monocycloolefin, is normally 1/100 to 1/100,000, preferably 1/200 to 1/50,000, more preferably 1/500 to 1/10,000 in range. Note that, the olefin compound having a silyl group acts as a molecular weight adjuster in addition to the action of introducing a silyl group to a polymer chain end of the cycloolefin rubber. If the amount of use of the olefin compound having a silyl group is too small, the rate of introduction of a silyl group in the cycloolefin rubber becomes low, while if too great, the molecular weight of the obtained cycloolefin rubber ends up becoming lower.

Further, as a ring-opening polymerization catalyst able to be used in the method of ring-opening polymerization of a monocycloolefin in the presence of an olefin compound having a silyl group, a ruthenium-carbene complex may be mentioned.

The ruthenium-carbene complex is not particularly limited so long as being ring-opening polymerization catalyst of a monocycloolefin. As specific examples of the ruthenium-carbene complex preferably used, bis(tricyclohexylphosphine)benzylideneruthenium dichloride, bis(triphenylphosphine)-3,3-diphenylpropenylideneruthenium dichloride, bis(tricyclohexylphosphine)t-butylvinylideneruthenium dichloride, bis(1,3-diisopropylimidazolin-2-ylidene)benzylideneruthenium dichloride, bis(1,3-dicyclohexylimidazolin-2-ylidene)benzylideneruthenium dichloride, (1,3-dimesitylimidazolin-2-ylidene)(tricyclohexylphosphine)benzylideneruthenium dichloride, (1,3-dimesitylimidazolidin-2-ylidene)(tricyclohexylphosphine)benzylidene ruthenium dichloride, bis(tricyclohexylphosphine)ethoxymethylideneruthenium dichloride, and (1,3-dimesitylimidazolidin-2-ylidene)(tricyclohexylphosphine)ethoxymethylidene ruthenium dichloride may be mentioned.

The amount of use of the ruthenium-carbene complex is not particularly limited, but as a molar ratio of (metal ruthenium in catalyst:monomer), is usually 1:2,000 to 1:2,000,000, preferably 1:5,000 to 1:1,500,000, more preferably 1:10,000 to 1:1,000,000 in range. If the amount used is too small, sometimes the polymerization reaction does not sufficiently advance. On the other hand, if too large, removal of the catalyst residue from the obtained cycloolefin rubber becomes difficult.

The polymerization reaction may be performed in a solvent-less state, but in the present invention, from the viewpoint of control of the polymerization reaction, the polymerization reaction is preferably performed in a solution. When performing the polymerization in a solution, the solvent which is used is not particularly limited so long as it is a solvent which is inert in a polymerization reaction and can dissolve the monocycloolefin or polymerization catalyst etc. used in the polymerization. A hydrocarbon-based solvent or halogen-based solvent is preferably used. As the hydrocarbon-based solvent, for example, an aromatic hydrocarbon such as benzene, toluene, xylene, and ethylbenzene; an aliphatic hydrocarbon such as n-hexane, n-heptane, and n-octane; an alicyclic hydrocarbon such as cyclohexane, cyclopentane, and methylcyclohexane; etc. may be mentioned. Further, as the halogen-based solvent, for example, an alkyl halogen such as dichloromethane and chloroform; an aromatic halogen such as chlorobenzene and dichlorobenzene; etc. may be mentioned.

The polymerization temperature is not particularly limited, but is normally set to −50 to 100° C. in range. Further, the polymerization reaction time is preferably 1 minute to 72 hours, more preferably 5 hours to 20 hours. After the polymerization conversion rate reaches a predetermined value, it is possible to apply a known polymerization terminator to the polymerization system so as to make the polymerization reaction stop.

By doing this, it is possible to obtain a polymer solution containing a cycloolefin polymer having a silyl group at a polymer chain end.

As another ring-opening polymerization catalyst able to be used in the method of ring-opening polymerization of a monocycloolefin in the presence of an olefin compound having a silyl group, a molybdenum compound or tungsten compound may be mentioned. As specific examples of the molybdenum compound able to be used as a ring-opening polymerization catalyst, molybdenum pentachloride, molybdenum oxotetrachloride, and molybdenum (phenylimide)tetrachloride may be mentioned. Further, as specific examples of the tungsten compound, tungsten hexachloride, tungsten oxotetrachloride, tungsten (phenylimide)tetrachloride, monocatecholate tungsten tetrachloride, bis(3,5-di-tertiary-butyl)catecholate tungsten dichloride, bis(2-chloroethelate)tetrachloride, and tungsten oxotetraphenolate may be mentioned.

When using a molybdenum compound or a tungsten compound as a ring-opening polymerization catalyst, it is possible to use a combination of a organometallic compound as a catalytic promoter. As the organometallic compound which can be used as the catalytic promoter, an organometallic compound of metal atom of Group I, II, XII, XIII, or XIV of the Periodic Table having a hydrocarbon group having 1 to 20 carbon atoms may be mentioned. Among these, an organolithium compound, organomagnesium compound, organozinc compound, organoaluminum compound, and organotin compound are preferably used, an organolithium compound, organotin compound, and organoaluminum compound are more preferably used, and an organoaluminum is particularly preferably used.

As specific examples of the organolithium compound which can be used as a catalytic promoter, n-butyllithium, methyllithium, phenyllithium, neopentyllithium, and neophyllithium may be mentioned. As specific examples of the organomagnesium compound, butylethylmagnesium, butyloctylmagnesium, dihexylmagnesium, ethylmagnesium chloride, n-butylmagnesium chloride, allylmagnesium bromide, neopentylmagnesium chloride, and neophylmagnesium chloride may be mentioned. As specific examples of the organozinc compound, dimethylzinc, diethylzinc, and diphenylzinc may be mentioned. As specific examples of the organotin compounds, tetramethyltin, tetra(n-butyl)tin, and tetraphenyltin may be mentioned. As specific examples of the organoaluminum compound, a trialkylaluminum such as trimethylaluminum, triethylaluminum, and triisobutylaluminum; an alkylaluminum halide such as diethylaluminum chloride, ethylaluminum sesquichloride, and ethylaluminum dichloride; a compound represented by the following general formula (8); etc. may be mentioned.

$$(R^{53})_{3-x}Al(OR^{54})_x \quad (8)$$

In the general formula (8), each of $R^{53}$ and $R^{54}$ represents a hydrocarbon group having 1 to 20 carbon atoms, while "x" is $0<x<3$.

In the general formula (8), as specific examples of a hydrocarbon atom having 1 to 20 carbon atoms represented by $R^{53}$ and $R^{54}$, an alkyl group such as methyl group, ethyl group, isopropyl group, n-propyl group, isobutyl group, n-butyl group, t-butyl group, n-hexyl group, cyclohexyl group, n-octyl group, and n-decyl group; an aryl group such as phenyl group, 4-methylphenyl group, 2,6-dimethylphenyl group, 2,6-diisopropylphenyl group, and naphthyl group; etc. may be mentioned. Note that, the hydrocarbon group having 1 to 20 carbon atoms represented by $R^{53}$ and $R^{54}$ may be the same or may be different, but from the viewpoint of raising the ratio of a cis structure in the double bonds present in the repeating units of the cycloolefin rubber so as to obtain cycloolefin rubber excellent in physical properties as a rubber material, at least the hydrocarbon group which is expressed by $R^{53}$ is preferably an alkyl group in which four or more carbon atoms are successively bonded, particularly preferably is any one of a n-butyl group, 2-methyl-pentyl group, n-hexyl group, cyclohexyl group, n-octyl group, and n-decyl group.

Further, in the general formula (8), "x" is $0<x<3$, but from the viewpoint of increasing the ratio of a cis structure at the double bonds present in the repeating units of the cycloolefin rubber so as to obtain a cycloolefin rubber excellent in properties as a rubber material, it is preferable to use an organoaluminum compound represented by the general formula (8) in which "x" is $0.5<x<1.5$ in range as the catalytic promoter.

The polymerization reaction conditions etc. in the case of using a molybdenum compound or a tungsten compound as a ring-opening polymerization catalyst may be suitably set in the range of conditions explained for the case of using a ruthenium-carbene complex.

Next, in the method of production of the present invention, the cycloolefin polymer having a silyl group at a polymer chain end contained in the polymer solution containing a cycloolefin polymer having a silyl group at a polymer chain end obtained in the above way is made to coagulate in the presence of a fatty acid ester of a polyvalent alcohol to thereby recover the cycloolefin rubber of the present invention from the polymer solution.

In the method of production of the present invention, it is possible to make the cycloolefin rubber obtained by coagulation in the presence of a fatty acid ester of a polyvalent alcohol one containing a fatty acid ester of a polyvalent alcohol. In the method of production of the present invention, as the fatty acid ester of a polyvalent alcohol, for example, it is possible to use the above-mentioned ones. Further, the method of coagulation in the presence of a fatty acid ester of a polyvalent alcohol is not particularly limited. It is not particularly limited so long as performing coagulation in the state that a fatty acid ester of a polyvalent alcohol is contained in the system when performing the actual coagulation operation.

As a specific method when performing coagulation, for example, the method of adding a fatty acid ester of a polyvalent alcohol to the polymer solution after polymerization, then performing steam stripping or poor solvent coagulation may be mentioned. Alternatively, when using poor solvent coagulation, as the poor solvent, it is possible to use one in which a fatty acid ester of a polyvalent alcohol is added in advance. In this case, a fatty acid ester of a polyvalent alcohol may be added to the polymer solution after polymerization or may not be added to it.

Note that, the amount of use of the fatty acid ester of a polyvalent alcohol in this case may be made an amount where the content of the fatty acid ester of a polyvalent alcohol in the obtained cycloolefin rubber becomes the above-mentioned range. For example, when adding a fatty acid ester of a polyvalent alcohol to the polymer solution after polymerization and then performing steam stripping or poor solvent coagulation, at the time of steam stripping and poor solvent coagulation, part of the fatty acid ester of a polyvalent alcohol in the polymer solution will dissolve in an aqueous phase or poor solvent phase, so the content of the fatty acid ester of a polyvalent alcohol in the obtained cycloolefin rubber sometimes becomes smaller than the amount added to the polymer solution, but the content of the fatty acid ester of a polyvalent alcohol in the obtained cycloolefin rubber may be adjusted to become an amount in the above-mentioned range. Further, even when including the fatty acid ester of a polyvalent alcohol in a poor solvent, part of the fatty acid ester of a polyvalent alcohol in the poor solvent will dissolve in the polymer solution, so it is sufficient to adjust the amount of the fatty acid ester of a polyvalent alcohol added to the poor solvent while considering such an amount.

Here, the "poor solvent" means a solvent unable to completely dissolve the cycloolefin polymer under a condition of a temperature 25° C. when adding it in a concentration of 1 wt %. As such a poor solvent, it is sufficient to suitably select one in accordance with the type of the cycloolefin rubber which is used, but, for example, alcohols such as ethanol, methanol, and isopropanol; ketones such as acetone and methylethylketone; esters such as ethyl acetate and methyl acetate; etc. may be mentioned. Note that, these solvents may be used mixed as well.

The boiling point of the poor solvent is preferably 30 to 200° C., more preferably 30 to 100° C., particularly preferably 40 to 90° C.

Note that, the obtained cycloolefin rubber may, if desired, have an antioxidant such as a phenol-based stabilizer, phosphorus-based stabilizer, and sulfur-based stabilizer added to it. The amount of addition of the antioxidant may be suitably determined in accordance with the type etc.

(Rubber Composition)

The rubber composition of the present invention comprises 100 parts by weight of a rubber ingredient including the cycloolefin rubber of the present invention and a total of 20 to 200 parts by weight of silica and/or carbon black blended into it. The total amount of the silica and/or carbon black is preferably 25 to 180 parts by weight, more preferably 30 to 150 parts by weight.

As specific examples of the silica used in the rubber composition of the present invention, for example, dry type white carbon, wet type white carbon, colloidal silica, and precipitated silica disclosed in Japanese Patent Publication No. 62-62838A may be mentioned. Among these as well, wet type white carbon containing hydrous silicic acid as a main ingredient is preferable. Further, a carbon-silica dual phase filler comprised of carbon black on the surface of which silica is carried may also be used. These silica may be used respectively alone or as two types or more combined.

The nitrogen adsorption specific surface area of the silica (measured by BET method based on ASTM D3037-81) is preferably 50 to 400 $m^2/g$, more preferably 100 to 220 $m^2/g$. Further, the pH of the silica is preferably less than pH7, more preferably is pH5 to 6.9. If pH is in these ranges, the affinity between the cycloolefin rubber and the silica becomes particularly good.

When using silica, the rubber composition preferably further contains a silane coupling agent mixed into it for the purpose of improving the adhesion between the cycloolefin rubber and the silica. As the silane coupling agent, for example, vinyltriethoxysilane, β-(3,4-epoxycyclohexyl)ethyltrimethoxysilane, N-(β-aminoethyl)-γ-aminopropyltrimethoxysilane, bis(3-(triethoxysilyl)propyl)tetrasulfide, bis(3-(triethoxysilyl)propyl)disulfide, etc. or the tetrasulfides described in Japanese Patent Publication No. 6-248116A such as γ-trimethoxysilylpropyldimethylthiocarbamyl tetrasulfide and γ-trimethoxysilylpropylbenzothiazyl tetrasulfide etc. may be mentioned. Among these, tetrasulfides are preferable. These silane coupling agents can be used respectively alone or as two types or more combined. The amount of the silane coupling agent is preferably 0.1 to 30 parts by weight with respect to 100 parts by weight of silica, more preferably 1 to 15 parts by weight.

As the carbon black able to be used in the rubber composition of the present invention, for example, furnace black, acetylene black, thermal black, channel black, and graphite may be mentioned. Among these as well, furnace black is preferable. As specific examples, SAF, ISAF, ISAF-HS, ISAF-LS, IISAF-HS, HAF, HAF-HS, HAF-LS, FEF, etc. may be mentioned. These carbon black may be used respectively alone or as two types or more combined.

The nitrogen adsorption specific surface area ($N_2SA$) of the carbon black is preferably 5 to 200 $m^2/g$, more preferably 80 to 130 $m^2/g$, while the dibutyl phthalate (DBP) adsorption amount is preferably 5 to 300 ml/100 g, more preferably 80 to 160 ml/100 g.

The rubber composition of the present invention may further contain rubber other than the cycloolefin rubber of the present invention. As the rubber other than the cycloolefin rubber of the present invention, for example, natural rubber (NR), polyisoprene rubber (IR), emulsion polymerized SBR (styrene-butadiene copolymer rubber), solution polymerized random SBR (amount of bounded styrene 5 to 50 wt %, 1,2-bond content in butadiene part 10 to 80%), high trans SBR (trans bond content in butadiene part 70 to 95%), low cis BR (polybutadiene rubber), high cis BR, high trans BR (trans bond content in butadiene part 70 to 95%), styrene-isoprene copolymer rubber, butadiene-isoprene copolymer rubber, emulsion polymerized styrene-acrylonitrile-butadiene copolymer rubber, acrylonitrile-butadiene copolymer rubber, high vinyl SBR-low vinyl SBR block copolymer rubber, polyisoprene-SBR block copolymer rubber, polystyrene-polybutadiene-polystyrene block copolymer, acrylic rubber, epichlorohydrin rubber, fluororubber, silicone rubber, ethylene-propylene rubber, urethane rubber, etc. may be mentioned. Among these, NR, BR, IR, and SBR are preferably used. These rubbers can be used respectively alone or as two types or more combined.

If the rubber composition of the present invention contains rubber other than the cycloolefin rubber of the present invention, it is preferable to make the ratio of the cycloolefin rubber 10 wt % or more with respect to the total amount of the rubber ingredients. 20 to 90 wt % in range is more preferable, while 30 to 80 wt % in range is particularly preferable. If this ratio is too low, the rubber composition is liable to become inferior in physical properties.

The rubber composition of the present invention may contain, in addition to the above components, compounding agents such as a cross-linking agent, cross-linking accelerator, cross-linking activator, antioxidant, activator, process oil, plasticizer, and lubricant, mixed in necessary amounts by an ordinary method.

As the cross-linking agent, sulfurs such as powdered sulfur, precipitated sulfur, colloidal sulfur, insoluble sulfur, and high dispersion sulfur; halogenated sulfurs such as sulfur monochloride and sulfur dichloride; organic peroxides such as dicumyl peroxide and ditertiary butyl peroxide; quinonedioximes such as p-quinonedioxime, p,p'-dibenzoylquinonedioxime; organic polyvalent amine compounds such as triethylenetetramine, hexamethylenediamine carbamate, and 4,4'-methylenebis-o-chloroaniline; alkylphenol resin with a methylol group; etc. may be mentioned. Among these as well, sulfur is preferable while powdered sulfur is more preferable. These cross-linking agents are used respectively alone or as two types or more combined. The amount of the cross-linking agent is preferably 0.1 to 15 parts by weight with respect to 100 parts by weight of the total rubber ingredient, more preferably 0.5 to 5 parts by weight.

As the cross-linking accelerator, for example, a sulfenamide-based cross-linking accelerator such as N-cyclohexyl-2-benzothiazylsulfenamide, N-t-butyl-2-benzothiazolesulfenamide, N-oxyethylene-2-benzothiazolesulfenamide, N-oxyethylene-2-benzothiazolesulfenamide, and N,N'-diisopropyl-2-benzothiazolesulfenamide; a guanidine-based cross-linking accelerator such as diphenylguanidine, di-o-tolylguanidine, o-tolylbiguanidine; a thiourea-based cross-linking accelerator such as diethylthiourea; a thiazole-based cross-linking accelerator such as 2-mercaptobenzothiazole, diobenzothiazyl disulfide, and a 2-mercaptobenzothiazole zinc salt; a thiuram-based cross-linking accelerator such as tetramethylthiuram monosulfide and tetramethylthiuram disulfide; a dithiocarbamic acid-based cross-linking accelerator such as sodium dimethyldithiocarbamate and zinc diethyldithiocarbamate; a xanthogenic acid-based cross-linking accelerator such as sodium isopropyl xanthogenate, zinc isopropyl xanthogenate, and zinc butyl xanthogenate; etc. may be mentioned. Among these, one containing a sulfenamide-based cross-linking accelerator is preferable. These cross-linking accelerators may be respectively used alone or as two types or more combined. The amount of the cross-linking accelerator is preferably 0.1 to 15 parts by weight with respect to 100 parts by weight of the total rubber ingredient, more preferably 0.5 to 5 parts by weight.

As the cross-linking activator, for example, a higher fatty acid such as stearic acid or zinc oxide etc. may be used. The zinc oxide is preferably one with a high surface activity and with a particle size of 5 µm or less. For example, active zinc white with a particle size of 0.05 to 0.2 µm, zinc white of 0.3 to 1 µm, etc. may be mentioned. Further, as the zinc oxide, one treated on its surface by an amine-based dispersant or wetting agent etc. may be used. The amount of the cross-linking activator may be suitably selected, but the amount of the higher fatty acid is preferably 0.05 to 15 parts by weight with respect to 100 parts by weight of the total rubber ingredient, more preferably 0.5 to 5 parts by weight, while the amount of the zinc oxide is preferably 0.05 to 10 parts by weight with respect to 100 parts by weight of the total rubber ingredient, more preferably 0.5 to 3 parts by weight.

As the process oil, a mineral oil or synthetic oil may be used. As the mineral oil, an aroma oil, naphthene oil, paraffin oil, etc. are usually used. As other compounding agents, an activator such as diethyleneglycol, polyethyleneglycol, and silicone oil; a filler other than silica and carbon black such as calcium carbonate, talc, and clay; a tackifier such as a petroleum resin and coumarone resin; wax; etc. may be mentioned.

The rubber composition of the present invention can be obtained by kneading the each of components in accordance with an ordinary method. For example, the rubber composition can be obtained by kneading the rubber ingredient such as the cycloolefin rubber and the compounding agents other than the cross-linking agent and cross-linking accelerator, then mixing the cross-linking agent and cross-linking accelerator with the kneaded material. The mixing temperature of the rubber ingredient such as the cycloolefin rubber and the compounding agents other than the cross-linking agent and cross-linking accelerator is preferably 80 to 200° C., more preferably 120 to 180° C., while the kneading time is preferably 30 seconds to 30 minutes. The cross-linking agent and the cross-linking accelerator are usually mixed in after cooling down to 100° C. or less, preferably 80° C. or less.

The Mooney viscosity ($ML_{1+4}$, 100° C.) of the rubber composition of the present invention is preferably 20 to 130, more preferably 30 to 120, still more preferably 40 to 110. The cycloolefin rubber of the present invention is small in content of toluene insolubles, so the Mooney viscosity of the rubber composition is controlled to the above range and thereby the rubber composition has excellent processability. If the Mooney viscosity is too low, kneading at a high temperature becomes difficult and the dispersability of silica and carbon black becomes poor. On the other hand, if the Mooney viscosity is too high, kneading becomes difficult and, similarly, processability becomes inferior and dispersability of silica and carbon black become poor.

The rubber composition of the present invention is usually used as a cross-linked rubber by cross-linking. The cross-linking method is not particularly limited, but may be selected in accordance with the shape, size, etc. of the cross-linked product. The rubber composition may be filled and heated in the mold so as to cross-link it simultaneously with forming or a rubber composition formed in advance may be heated and cross-linked. The cross-linking temperature is preferably 120 to 200° C., more preferably 140 to 180° C., while the cross-linking time is normally 1 to 120 minutes or so.

The rubber composition of the present invention is excellent in affinity with silica and carbon black, so gives a cross-linked rubber excellent in low heat buildup property. Therefore, utilization for various applications making use of such characteristics, for example, various tire parts such as treads, carcasses, side walls, and beads or utilization for rubber products such as hoses, window frames, belts, shoes, shock absorbing rubber, and automobile parts and, furthermore, utilization as resin-reinforced rubber such as impact resistant polystyrene and ABS resin become possible. In particular, it is excellent for use as a tire tread of a low fuel consumption tire and is also suitable as the material for tire treads, side walls, undertreads, carcasses, beads, etc. of all season tires, high performance tires, studless tires, etc.

EXAMPLES

Below, the present invention will be explained based on further detailed examples, but the present invention is not limited to these examples. Note that, below, "parts", unless otherwise indicated, are based on weight. Further, the tests and evaluations were conducted as follows.

<Molecular Weight>

Using a gel permeation chromatography (GPC) system HLC-8220 (made by Toso) and an H-type column HZ-M (made by Toso), measurement was performed at 40° C. using tetrahydrofuran as a solvent to find the weight average molecular weight (Mw), and molecular weight distribution (Mw/Mn) of the cycloolefin rubber as values converted to polystyrene.

<Ratio of Introduction of End Silyl Group>

A deuterochloroform solution of a cycloolefin rubber was measured by $^1$H-NMR spectral measurement for the ratio of the integral value of the peak derived from a silyl group and the integral value of the peak derived from an olefin. Further, the measured ratio of integral values of the peaks and the results of measurement of the number average molecular weight (Mn) by the above GPC were used to calculate the ratio of introduction of end silyl group to a polymer chain of the cycloolefin rubber. The ratio of introduction of the end silyl group was found as the ratio of the number of silyl group with respect to one molecule of the cycloolefin rubber. That is, a ratio of introduction of silyl group of 100% indicates a state where a silyl group is introduced at a ratio of one per one molecule of the cycloolefin rubber, while a ratio of introduction of silyl group of 200% indicates a state where silyl groups are introduced at both ends of one molecule of the cycloolefin rubber.

<Content of Fatty Acid Ester of Polyvalent Alcohol>

2 g of the recovered cycloolefin rubber was extracted by acetone using a Soxhlet extractor, then the extracted product was condensed and dried. To this extracted product, 20 ml of methanol was added. This was ultrasonically treated, then filtered by a pore size 0.2 µm membrane filter, then the filtrate was measured by LC-MS. As a column of the LC-MS, ZORBAX SB-C18 (3.0 mm×100 mm) was used. Measurement was conducted under the following conditions.

Column temperature: 40° C.,
Flow rate: 0.4 ml/min,
Amount of injection: 1 ml, and
Standard sample for assay: each polyvalent alcohol fatty acid ester/methanol solution.

<Measurement of Amount of Toluene Insolubles>

To toluene, 1 wt % of cycloolefin rubber was added and stirred one day and night at room temperature. Next, this was filtered by a 100 mesh filter. The filter residue (filtered matter remaining on filter) was dried in vacuo at room temperature, then the weight of the filter residue was measured and the amount of toluene insolubles (%) was calculated.

<Measurement of Mooney Viscosity ($ML_{1+4}$, 100° C.)>

The Mooney viscosity was measured according to JIS K6300 using a Mooney viscometer (made by Shimadzu Corporation).

<Low Heat Buildup Property>

The rubber composition was cross-linked by pressing at 150° C. for 20 minutes to prepare a test piece. The obtained test piece was measured using a viscoelasticity measuring device EPLEXOR made by GABO to determine the tan δ at 60° C. under conditions of an initial strain of 0.5%, a dynamic strain of 1%, and 10 Hz. Further, the obtained measurement results were calculated indexed to the measurement value of the sample of the later explained Example 1 as 100. The larger the index, the worse the low heat buildup property indicated.

Reference Example 1

Preparation of Diisobutylaluminum Mono (n-hexoxide)/Toluene Solution (2.5 wt %)

In a nitrogen atmosphere, to a glass vessel containing a stirrer, 88 parts of toluene and 7.8 parts of a 25.4 wt % triisobutylaluminum/n-hexane solution (made by Toso-Finechem) were added. The mixture was cooled to −45° C., then vigorously stirred while slowly adding dropwise 1.02 parts of n-hexanol (equimolar amount with respect to triisobutylaluminum). After that, the mixture was stirred and allowed to stand until reaching room temperature to prepare a diisobutylaluminum mono(n-hexoxide)/toluene solution (2.5 wt %).

Production Example 1

Production of End-Silyl-Modified Cycloolefin Polymer Solution (A-1)

In a nitrogen atmosphere, to a pressure resistant reaction vessel equipped with a stirrer, 435 parts of a 1.0 wt % $WCl_6$/toluene solution and 215 parts of 2.5 wt % diisobutylaluminum mono(n-hexoxide)/toluene solution prepared in Reference Example 1 were added and stirred for 15 minutes to obtain a catalyst solution. Further, in a nitrogen atmosphere, to a pressure resistant glass reaction vessel equipped with a stirrer, 1500 parts of cyclopentene as a monocycloolefin and 5.4 parts of bis(triethoxysilyl)ethylene were added. To this, 650 parts of the catalyst solution prepared above was added and a polymerization reaction performed at 25° C. for 4 hours. After the 4 hours of a polymerization reaction, an excess of ethyl alcohol was added to the pressure resistant reaction vessel to stop the polymerization to obtain an end-silyl-modified cycloolefin polymer solution (A-1). A small amount of the polymer solution (A-1) inside the pressure resistant reaction vessel was sampled and coagulated by being dropped in a large excess of ethanol then was dried at 40° C. for 3 days. This sample was measured for molecular weight and ratio of introduction of end silyl group. As a result, the weight average molecular weight Mw was 366,000, the molecular weight distribution Mw/Mn was 1.90, and the ratio of introduction of end silyl group was 186%. The remaining polymer solution (A-1) inside the pressure resistant reaction vessel was divided into six equal parts and used for Examples 1 to 4 and Comparative Examples 1 and 2.

Production Example 2

Production of End-Silyl-Modified Cycloolefin Polymer Solution (A-2)

In a nitrogen atmosphere, to a pressure resistant reaction vessel equipped with a stirrer, 1000 parts of cyclopentene as a monocycloolefin, 1.15 parts of allyltriethoxysilane, and 950 parts of toluene were added. Next, 0.25 part of (1,3-dimesitylimidazolidin-2-ylidene) (tricyclohexylphosphine) benzylideneruthenium dichloride dissolved in 50 parts of toluene was added and a polymerization reaction performed at a polymerization temperature of 40° C. for 3 hours. An excess of vinylethyl ether was added to stop the polymerization to obtain an end-silyl-modified cycloolefin polymer solution (A-2). A small amount of the polymer solution (A-2) inside the pressure resistant reaction vessel was sampled and coagulated by being dropped in a large excess of ethanol then was dried at 40° C. for 3 days. This sample was measured for molecular weight and ratio of introduction of end silyl group. As a result, the weight average molecular weight Mw was 424,000, the molecular weight distribution Mw/Mn was 1.89, and the ratio of introduction of end silyl group was 95%. The remaining polymer solution (A-2) inside the pressure resistant reaction vessel was divided into four equal parts and used for Examples 5 and 6 and Comparative Examples 3 and 4.

Example 1

The polymer solution (A-1) obtained in Production Example 1 was poured in a large excess of ethyl alcohol containing 1 wt % concentration sorbitan monolaurate (made by Tokyo Chemical Industry) and 0.15 wt % concentration Irganox 1520L (antioxidant, made by Ciba Specialty Chemicals). Next, the precipitated polymer was recovered and dried in vacuo at 40° C. over 3 days to obtain 100 parts of a silyl-modified cycloolefin rubber. The content of sorbitan monolaurate in the obtained silyl-modified cycloolefin rubber was 0.7 wt % (2.1 moles with respect to 1 mole of the silyl group), while the amount of toluene insolubles in the cycloolefin rubber was 0 wt %. The obtained cycloolefin rubber was stored for one day in a thermohygrostat of a temperature of 85° C. and humidity of 85%. The result was taken out the next day and measured for content of toluene insolubles, whereupon it was found to be 0.6 wt %.

Next, 80 parts of cycloolefin rubber after a 85° C.×85% test and 20 parts of natural rubber were masticated in a volume 250 ml Bambury mixer for 30 seconds, then 50 parts of silica (product name "Zeosil 1165MP", made by Rhodia (nitrogen absorption specific surface area (BET method): 163 $m^2/g$)) and 4 parts of silane coupling agent (bis(3-(triethoxysilyl)propyl) tetrasulfide) were added. Next, this was kneaded for 1.5 minutes with a start temperature for kneading of 80° C., then 25 parts of silica (product name "Zeosil 1165MP"), 3 parts of zinc oxide (Zinc White No. 1), 2 parts of stearic acid (product name "SA-300", made by ADEKA), and 2 parts of an antioxidant (N-phenyl-N'-(1,3-dimethylbutyl)-p-phenylenediamine, product name "Nocrac 6C", made by Ouchi Shinko Chemical Industrial) were added and kneaded for 2.5 minutes. After the end of kneading, the kneaded rubber was discharged from the Bambury mixer. Further, the obtained kneaded rubber was cooled to room temperature, then was again kneaded in a Bambury mixer for 3 minutes. After finishing being kneaded, the kneaded rubber was discharged form the Bambury mixer. Next, using an open roll, the obtained kneaded rubber was kneaded with 1.4 parts of sulfur and 2.4 parts of a cross-linking accelerator (mixture of 1.2 parts of N-t-butyl-2-benzothiazolylsulfenamide (product name "Noccelar NS", made by Ouchi Shinko Chemical Industrial) and 1.2 parts of diphenylguanidine (product name "Noccelar D", made by Ouchi Shinko Chemical Industrial)) at 50° C. to obtain a sheet-shaped rubber composition.

Further, part of the obtained rubber composition was used to measure the compound Mooney viscosity ($Ml_{1+4}$, 100° C.). Next, the obtained rubber composition was pressed at 150° C. for 20 minutes for cross-linking to prepare a test piece and evaluated for the low heat buildup property. The results are shown in Table 1.

Example 2

To the polymer solution (A-1) obtained in the Production Example 1, sorbitan monooleate (made by Tokyo Chemical Industry) in an amount of 1 part by weight and Irganox 1520L in an amount of 0.15 part by weight were added with respect to 100 parts by weight of the cycloolefin polymer ingredient in the polymer solution, then steam stripping was used to remove the solvent and the result was dried in vacuo at 40° C. for 3 days to thereby obtain 100 parts of a silyl-modified cycloolefin rubber. The content of sorbitan monooleate in the obtained silyl-modified cycloolefin rubber was 0.4 wt % (1.0 mole with respect to 1 mole of the silyl group), while the amount of toluene insolubles in the cycloolefin rubber was 0.1 wt %. The obtained cycloolefin rubber was stored for one day in a thermohygrostat of a temperature of 85° C. and humidity of 85%. The result was taken out the next day and measured for content of toluene insolubles, whereupon it was found to be 1.2 wt %.

Next, using the cycloolefin rubber after the 85° C.×85% test, the same procedure was followed as in Example 1 to obtain a sheet-shaped rubber composition. Part of the obtained rubber composition was used to measure the compound Mooney viscosity ($ML_{1+4}$, 100° C.). Next, the obtained rubber composition was pressed at 150° C. for 20 minutes for cross-linking to prepare a test piece and evaluated for the low heat buildup property. The results are shown in Table 1.

Example 3

The polymer solution (A-1) obtained in Production Example 1 was poured into a large excess of ethyl alcohol containing 5 wt % concentration polyoxyethylenesorbitan trioleate (made by Kao, product name Rheodol TW-0320V) and 0.15 wt % concentration Irganox 1520L (antioxidant, made by Ciba Specialty Chemicals). Next, the precipitated polymer was recovered and dried in vacuo at 40° C. for 3 days to obtain 100 parts of a silyl-modified cycloolefin rubber. The content of polyoxyethylenesorbitan trioleate in the obtained silyl-modified cycloolefin rubber was 4.3 wt % (15 moles with respect to 1 mole of the silyl group), while the amount of toluene insolubles in the cycloolefin rubber was 0 wt %. The obtained cycloolefin rubber was stored for one day in a thermohygrostat of a temperature of 85° C. and humidity of 85%. The result was taken out the next day and measured for content of toluene insolubles, whereupon it was found to be 0.4 wt %.

Next, using the cycloolefin rubber after the 85° C.×85% test, the same procedure was followed as in Example 1 to obtain a sheet-shaped rubber composition. Part of the obtained rubber composition was used to measure the compound Mooney viscosity ($ML_{1+4}$, 100° C.). Next, the obtained rubber composition was pressed at 150° C. for 20 minutes for cross-linking to prepare a test piece and evaluated for the low heat buildup property. The results are shown in Table 1.

Example 4

To the polymer solution (A-1) obtained in Production Example 1, polyoxyethylenesorbitan monolaurate (made by Kao, product name Rheodol TW-L120) in an amount of 5 parts by weight and Irganox 1520L in an amount of 0.2 part by weight were added with respect to 100 parts by weight of the cycloolefin polymer ingredient in the polymer solution, then steam stripping was used to remove the solvent and the result was dried in vacuo at 40° C. for 3 days to thereby obtain 102 parts of a silyl-modified cycloolefin rubber. The content of polyoxyethylenesorbitan monolaurate in the obtained silyl-modified cycloolefin rubber was 0.06 wt % (0.11 mole with respect to 1 mole of the silyl group), while the amount of toluene insolubles in the cycloolefin rubber was 0 wt %. The obtained cycloolefin rubber was stored for one day in a thermohygrostat of a temperature of 85° C. and humidity of 85%. The result was taken out the next day and measured for content of toluene insolubles, whereupon it was found to be 0 wt %.

Next, using the cycloolefin rubber after the 85° C.×85% test, the same procedure was followed as in Example 1 to obtain a sheet-shaped rubber composition. Part of the obtained rubber composition was used to measure the compound Mooney viscosity ($ML_{1+4}$, 100° C.). Next, the obtained rubber composition was pressed at 150° C. for 20 minutes for cross-linking to prepare a test piece and evaluated for the low heat buildup property. The results are shown in Table 1.

Comparative Example 1

Except for not adding sorbitan monolaurate to the polymer solution (A-1) obtained in Production Example 1, the same procedure was followed as in Example 1 to obtain 100 parts of silyl-modified cycloolefin rubber. The amount of toluene insolubles in the obtained cycloolefin rubber was 0 wt %. The obtained cycloolefin rubber was stored for one day in a thermohygrostat of a temperature of 85° C. and humidity of 85%. The result was taken out the next day and measured for content of toluene insolubles, whereupon it was found to be 67 wt %.

Next, using the cycloolefin rubber after the 85° C.×85% test, the same procedure was followed as in Example 1 to try to prepare a sheet-shaped rubber composition, but the viscosity of the mixture was high and kneading was not possible.

Comparative Example 2

Except for not adding sorbitan monolaurate to the polymer solution (A-1) obtained in Production Example 1, the same procedure was followed as in Example 2 to obtain 100 parts of silyl-modified cycloolefin rubber. The amount of toluene insolubles in the obtained cycloolefin rubber was 64 wt %. The obtained cycloolefin rubber was stored for one day in a thermohygrostat of a temperature of 85° C. and humidity of 85%. The result was taken out the next day and measured for content of toluene insolubles, whereupon it was found to be 77 wt %.

Next, using the cycloolefin rubber after the 85° C.×85% test, the same procedure was followed as in Example 1 to try to prepare a sheet-shaped rubber composition, but the viscosity of the mixture was high and kneading was not possible.

Example 5

The polymer solution (A-2) obtained in Production Example 2 was poured in a large excess of ethyl alcohol containing 1 wt % concentration sorbitan monostearate (made by Tokyo Chemical Industry) and 0.15 wt % concentration Irganox 1520L. Next, the precipitated polymer was recovered and dried in vacuo at 40° C. over 3 days to obtain 150 parts of a silyl-modified cycloolefin rubber. The content of sorbitan monostearate in the obtained silyl-modified cycloolefin rubber was 0.8 wt % (4.6 moles with respect to 1 mole of the silyl group), while the amount of toluene insolubles in the cycloolefin rubber was 0 wt %. The obtained cycloolefin rubber was stored for one day in a thermohygrostat of a temperature of 85° C. and humidity of 85%. The result was taken out the next day and measured for content of toluene insolubles, whereupon it was found to be 0.3 wt %.

Next, using the cycloolefin rubber after the 85° C.×85% test, the same procedure was followed as in Example 1 to obtain a sheet-shaped rubber composition. Part of the obtained rubber composition was used to measure the compound Mooney viscosity ($ML_{1+4}$, 100° C.). Next, the obtained rubber composition was pressed at 150° C. for 20 minutes for cross-linking to prepare a test piece and evaluated for the low heat buildup property. The results are shown in Table 1.

Example 6

To the polymer solution (A-2) obtained in Production Example 2, sorbitan monolaurate (made by Tokyo Chemical Industry) in an amount of 1 part by weight and Irganox 1520L in an amount of 0.15 part by weight were added with respect to 100 parts by weight of the cycloolefin polymer ingredient in the polymer solution, then steam stripping was used to remove the solvent and the result was dried in vacuo at 40° C. for 3 days to thereby obtain 150 parts of a silyl-modified cycloolefin rubber. The content of sorbitan monolaurate in the obtained silyl-modified cycloolefin rubber was 0.25 wt % (1.6 moles with respect to 1 mole of the silyl group), while the amount of toluene insolubles in the cycloolefin rubber was 0.1 wt %. The obtained cycloolefin rubber was stored for one day in a thermohygrostat of a temperature of 85° C. and humidity of 85%. The result was taken out the next day and measured for content of toluene insolubles, whereupon it was found to be 0.5 wt %.

Next, using the cycloolefin rubber after the 85° C.×85% test, the same procedure was followed as in Example 1 to obtain a sheet-shaped rubber composition. Part of the obtained rubber composition was used to measure the compound Mooney viscosity ($ML_{1+4}$, 100° C.). Next, the obtained rubber composition was pressed at 150° C. for 20 minutes for cross-linking to prepare a test piece and evaluated for the low heat buildup property. The results are shown in Table 1.

Comparative Example 3

Except for not adding sorbitan monostearate to the polymer solution (A-2) obtained in Production Example 2, the same procedure was followed as in Example 5 to obtain 150 parts of a silyl-modified cycloolefin rubber. The amount of toluene insolubles in the obtained silyl-modified cycloolefin rubber was 0.1 wt %. The obtained cycloolefin rubber was stored for one day in a thermohygrostat of a temperature of 85° C. and humidity of 85%. The result was taken out the next day and measured for content of toluene insolubles, whereupon it was found to be 65 wt %.

Next, using the cycloolefin rubber after a test of 85° C.×85%, the same procedure was followed as in Example 1 to try to prepare a sheet-shaped rubber composition, but the viscosity of the mixture was high and kneading was not possible.

Comparative Example 4

Except for not adding sorbitan monolaurate to the polymer solution (A-2) obtained in Production Example 2, the same procedure was followed as in Example 6 to obtain 150 parts of silyl-modified cycloolefin rubber. The amount of toluene insolubles in the obtained silyl-modified cycloolefin rubber was 25 wt %.

Next, using the obtained cycloolefin rubber, the same procedure was followed as in Example 1 to obtain a sheet-shaped rubber composition. Part of the obtained rubber composition was used to measure the compound Mooney viscosity ($ML_{1+4}$, 100° C.). Next, the obtained rubber composition was pressed at 150° C. for 20 minutes for cross-linking to prepare a test piece and evaluated for the low heat buildup property. The results are shown in Table 1.

TABLE 1

| | Cycloolefin polymer | Amount of fatty acid ester of polyvalent alcohol | | Amount of toluene insolubles (%) | | Evaluation of rubber composition Compound | Evaluation of cross-linked rubber Evaluation of |
|---|---|---|---|---|---|---|---|
| | | (wt %/rubber) | (moles/silyl group) | After manufacture | After 85° C., 85%, 1 day | Mooney viscosity | low heat buildup property |
| Example 1 | Production Example 1 | 0.7 | 2.1 | 0.0 | 0.6 | 86 | 100 |
| Example 2 | Production Example 1 | 0.4 | 1.0 | 0.1 | 1.2 | 88 | 102 |
| Example 3 | Production Example 1 | 4.3 | 15 | 0.0 | 0.4 | 84 | 99 |

TABLE 1-continued

| | Cycloolefin polymer | Amount of fatty acid ester of polyvalent alcohol (wt %/rubber) | (moles/silyl group) | Amount of toluene insolubles (%) After manufacture | After 85° C., 85%, 1 day | Evaluation of rubber composition Compound Mooney viscosity | Evaluation of cross-linked rubber Evaluation of low heat buildup property |
|---|---|---|---|---|---|---|---|
| Example 4 | Production Example 1 | 0.06 | 0.11 | 0.0 | 0.0 | 81 | 101 |
| Example 5 | Production Example 2 | 0.8 | 4.6 | 0.0 | 0.3 | 73 | 115 |
| Example 6 | Production Example 2 | 0.25 | 1.6 | 0.1 | 0.5 | 75 | 113 |
| Comparative Example 1 | Production Example 1 | None | | 0.0 | 67 | Viscosity high, kneading not possible | — |
| Comparative Example 2 | Production Example 1 | None | | 64 | 77 | Viscosity high, kneading not possible | — |
| Comparative Example 3 | Production Example 2 | None | | 0.1 | 65 | Viscosity high, kneading not possible | — |
| Comparative Example 4 | Production Example 2 | None | | 25 | Not performed | 139 | 133 |

Summary of Examples and Comparative Examples

A cycloolefin rubber having a weight average molecular weight of 100,000 to 800,000, having a silyl group at a polymer chain end, and containing a fatty acid ester of a polyvalent alcohol had a content of toluene insolubles after storage for one day under a condition of a temperature of 85° C. and humidity of 85% of less than 20 wt %, was all excellent in processability and could be sufficiently kneaded even after storage for one day a under condition of a temperature of 85° C. and humidity of 85%, and gave excellent results in a low heat buildup property test when made into a cross-linked rubber (Examples 1 to 4).

On the other hand, a cycloolefin rubber not containing a fatty acid ester of a polyvalent alcohol had a content of toluene insolubles after storage for one day under a condition of a temperature of 85° C. and humidity of 85% of over 20 wt %, was all poor in processability and insufficient in kneading, and could not be tested for low heat buildup property (Comparative Examples 1 to 3). Furthermore, even before storage for one day under a condition of a temperature of 85° C. and humidity of 85%, when using a cycloolefin rubber not containing a fatty acid ester of a polyvalent alcohol to be kneaded and be a cross-linked rubber, the result was poor in a low heat buildup property test (Comparative Example 4).

The invention claimed is:

1. A method of production of a cycloolefin rubber having a weight average molecular weight of 100,000 to 800,000, having a silyl group at a polymer chain end, and containing a fatty acid ester of a polyvalent alcohol, the method comprising:
    a first step of performing ring-opening polymerization of a monocycloolefin and end modification by a compound having a silyl group to obtain a polymer solution containing a cycloolefin polymer having a silyl group at a polymer chain end, and
    a second step of causing the cycloolefin polymer contained in the polymer solution to coagulate in the presence of the fatty acid ester of a polyvalent alcohol.

2. The method of production of a cycloolefin rubber according to claim 1, wherein the second step includes adding the fatty acid ester of a polyvalent alcohol to the polymer solution, then performing steam stripping.

3. The method of production of a cycloolefin rubber according to claim 1, wherein
    the second step includes performing a poor solvent coagulation of the polymer solution, the poor solvent coagulation causing the cycloolefin polymer to coagulate by using a poor solvent for the cycloolefin polymer having a silyl group at a polymer chain end, and
    in the poor solvent coagulation, the fatty acid ester of a polyvalent alcohol is used in a state where the fatty acid ester of a polyvalent alcohol is contained in the polymer solution and/or the poor solvent.

4. The method of production of a cycloolefin rubber according to claim 1, wherein a content of the fatty acid ester of a polyvalent alcohol in the cycloolefin rubber is 0.0002 to 15 wt %.

5. The method of production of a cycloolefin rubber according to claim 1, wherein a content of the fatty acid ester of a polyvalent alcohol is 0.001 to 100 moles with respect to 1 mole of the silyl group.

6. The method of production of a cycloolefin rubber according to claim 1, wherein the fatty acid ester of a polyvalent alcohol is a sorbitan fatty acid ester.

* * * * *